United States Patent
Lu et al.

(10) Patent No.: US 11,436,532 B2
(45) Date of Patent: Sep. 6, 2022

(54) IDENTIFYING DUPLICATE ENTITIES

(71) Applicant: Microsoft Technology Licensing, LLC, Redmond, WA (US)

(72) Inventors: Tianhao Lu, New York, NY (US); Junzhe Miao, San Jose, CA (US); Yunpeng Xu, Millburn, NJ (US); Dan Shacham, Sunnyvale, CA (US); Hong H. Tam, Fremont, CA (US); Tao Xiong, Jersey City, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 16/703,386

(22) Filed: Dec. 4, 2019

(65) Prior Publication Data

US 2021/0173825 A1    Jun. 10, 2021

(51) Int. Cl.
*G06N 20/00*    (2019.01)
*G06F 16/174*    (2019.01)
*G06F 16/23*    (2019.01)
*G06F 16/953*    (2019.01)

(52) U.S. Cl.
CPC ........... *G06N 20/00* (2019.01); *G06F 16/174* (2019.01); *G06F 16/2365* (2019.01)

(58) Field of Classification Search
CPC ... G06N 20/00; G06F 16/174; G06F 16/2365; G06F 16/953
See application file for complete search history.

(56) References Cited

U.S. PATENT DOCUMENTS

| | | | |
|---|---|---|---|
| 2019/0354810 A1* | 11/2019 | Samel | G06N 3/04 |
| 2020/0004765 A1* | 1/2020 | Sørensen | G06N 20/00 |
| 2020/0193165 A1* | 6/2020 | Grady | G06V 20/46 |
| 2020/0250560 A1* | 8/2020 | Cui | G06N 20/00 |
| 2020/0334557 A1* | 10/2020 | Kale | G06N 20/00 |
| 2020/0410169 A1* | 12/2020 | Pappu | G06N 3/088 |
| 2022/0070821 A1* | 3/2022 | Jiang | H04W 64/00 |

* cited by examiner

*Primary Examiner* — Harry H Kim
(74) *Attorney, Agent, or Firm* — Nicholson De Vos Webster & Elliott LLP (57) ABSTRACT

The disclosed embodiments provide a system that identifies duplicate entities. During operation, the system selects training data for a first machine learning model based on confidence scores representing likelihoods that pairs of entities in an online system are duplicates. Next, the system updates parameters of the first machine learning model based on features and labels in the training data. The system then identifies a first subset of additional pairs of the entities as duplicate entities based on scores generated by the first machine learning model from values of the features for the additional pairs and a first threshold associated with the scores. The system also determines a canonical entity in each of the duplicate entities based on additional features. Finally, the system updates content outputted in a user interface of the online system based on the identified first subset of the additional pairs.

18 Claims, 4 Drawing Sheets

IDENTIFYING DUPLICATE ENTITIES

BACKGROUND

Field

The disclosed embodiments relate to data processing. More specifically, the disclosed embodiments relate to techniques for identifying duplicate entities in datasets.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be implemented and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for identifying duplicate entities. In some embodiments, the duplicates include multiple representations of users, organizations, groups, goods, services, jobs, content, and/or other entities. The representations may be generated by and/or maintained in a data store, online system, or other system for storing, collecting, organizing, and/or presenting data related to the entities. For example, duplicates can be found in records or pages for companies in an online network. The duplicates can then be resolved to improve the integrity and quality of data presented to users in the online network.

First, pairs of entities in the online system are identified based on similarities in attributes of the entities. For example, each pair of entities is identified using one or more inverted indexes of the entities' names, addresses, phone numbers, website Uniform Resource Locators (URLs), logos, and/or other attributes. A similarity is calculated between attribute values for the identified entity pair. When the similarity meets a threshold, the pair is added to the identified pairs of entities. As a result, each of the identified pairs of entities represents a "candidate" pair of duplicated entities in the online system.

Next, one or more machine learning models are applied to data related to the pairs of entities to identify one or more subsets of the pairs of entities as duplicates. For example, features associated with each pair of entities are inputted into a first machine learning model to generate a confidence score representing the likelihood that the pair of entities includes duplicates of a single entity. The features include, but are not limited to, similarities calculated between one or more attributes of the first entity in the pair and one or more corresponding attributes of the second entity in the pair. The features also, or instead, include a distance between a first creator of the first entity and a second creator of the second entity (e.g., in the online network), the distance between a first set of members (or other types of entities) associated with the first entity and a second set of members (or other types of entities) associated with the second entity, and/or a comparison of the sizes of the two entities.

Continuing with the above example, training data for another machine learning model is generated and/or sampled based on confidence scores for the pairs of entities outputted by the first machine learning model. For example, stratified sampling is performed to select a certain number or proportion of pairs of entities from a given range of confidence scores. After pairs of entities are sampled across all possible ranges of confidence scores, attributes of each pair of entities are presented to a number of user annotators, and annotations of labels that indicate whether or not each pair of entities includes duplicates is received from the user annotators.

The annotated labels and additional features for the pairs of entities are used to train the other machine learning model to classify each pair of entities as duplicates or non-duplicates. For example, the additional features include, but are not limited to, measures of similarity between attributes of each pair of entities and/or the "density" of connections between members associated with each entity in the pair. The machine learning model includes a decision tree, random forest, deep learning model, wide-and-deep model, and/or another type of model that is trained to predict the labels, given features for the corresponding pair of entities.

The trained machine learning model is then used to identify additional pairs of entities in the online system as duplicates and update content outputted by the online system accordingly. For example, the trained machine learning model is applied to remaining entity pairs not included in the training data, and a subset of entity pairs with scores from the machine learning model that exceed a threshold are identified as duplicates. Additional rules and/or machine learning models are then used to select a "canonical" entity from each pair of entities identified as duplicates and/or merge fields in the pair of entities into a single consolidated entity. The canonical and/or consolidated entity is subsequently included in search results, recommendations, insights, and/or other content outputted by the online system in lieu of one or both of the original entities in the pair. In addition, duplicate entities that are not selected or used as canonical entities are suppressed, de-ranked, and/or removed from the online system.

By automatically identifying and reducing duplicate entities in the online system based on machine learning models and a small set of user-annotated labels, the disclosed embodiments improve the quality and integrity of data in the online system. Because the number of entities in the online system is reduced, consumption of processor, memory, storage, network, and/or other resources involved in storing, querying, transmitting, serving, and/or otherwise utilizing data representing the entities is also reduced. Moreover, the generation of candidate pairs of entities using inverted indexes allows duplicate detection and resolution to be performed in a more efficient, frequent, and/or scalable manner than a brute force approach that performs pairwise comparisons of all entities to detect duplicates.

In contrast, conventional techniques utilize business rules and/or manual review to identify and resolve duplicate entities. Such techniques can be less accurate and/or comprehensive in detecting duplicates than the disclosed embodiments. In turn, search results, recommendations, and/or other content generated and outputted based on the entities include a higher proportion of duplicate entities, which reduces the usefulness, trustworthiness, or quality of the content to users. The users may additionally reformulate searches and/or perform additional browsing or viewing of the content to select among the duplicate entities, which requires additional computational overhead and reduces the online system's bandwidth and/or ability to perform other types of processing. Consequently, the disclosed embodiments improve computer systems, applications, user experiences, tools, and/or technologies related to storing, processing, querying, and/or recommending data or content related to entities.

Identifying Duplicate Entities

Figure 1:
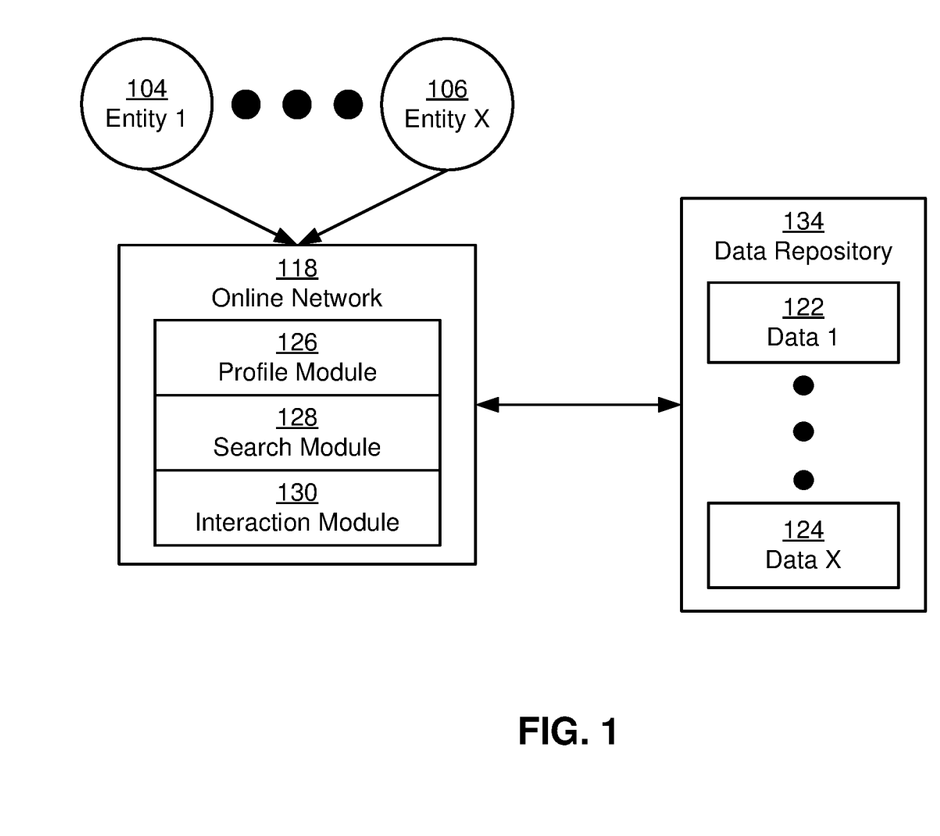
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other information maintained by online network 118. For example, the entities input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Figure 2:
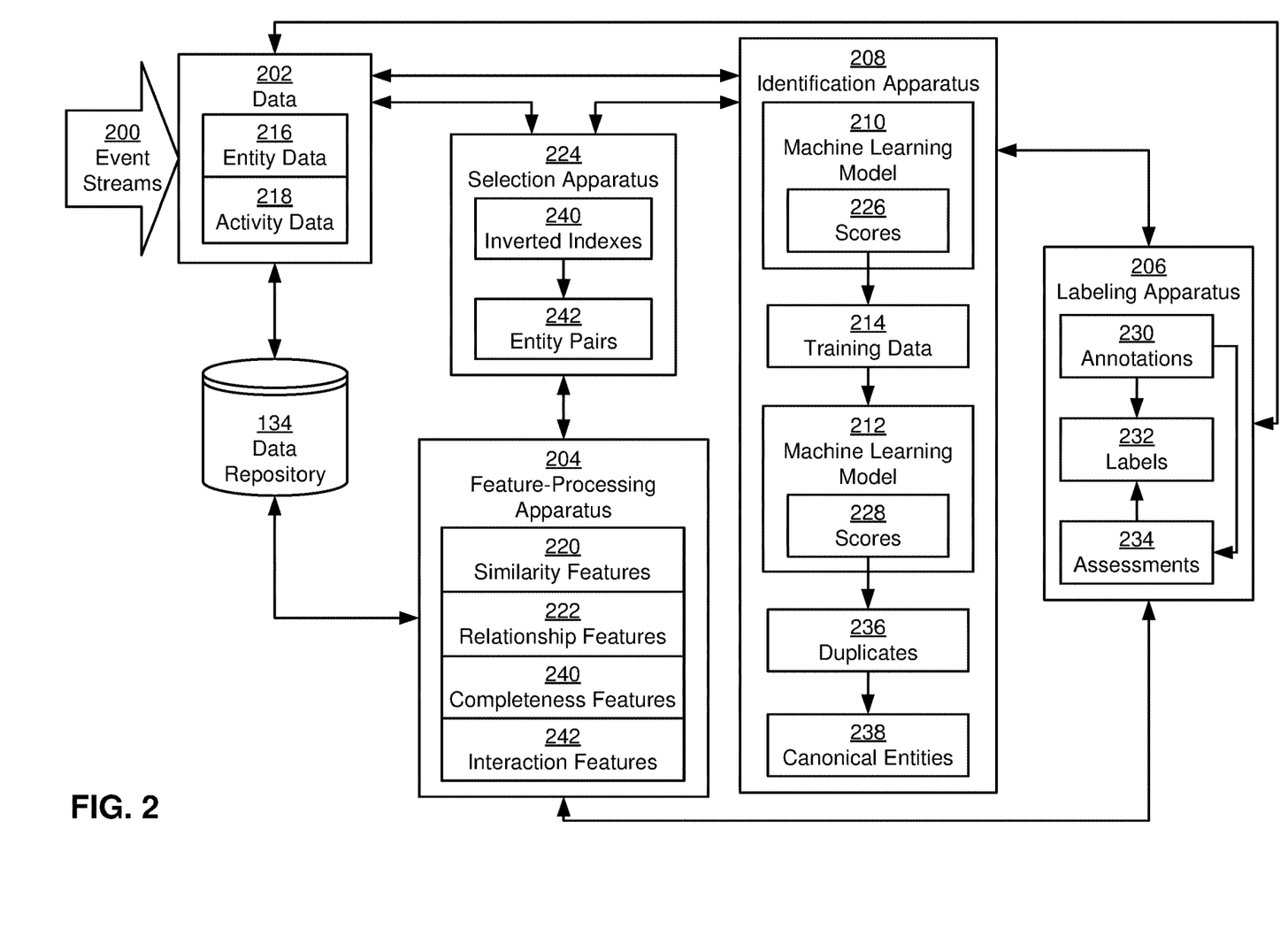
FIG. 2 shows a system for identifying duplicate entities in accordance with the disclosed embodiments.

As shown in FIG. 2, data repository 134 and/or another primary data store can be queried for data 202 that includes entity data 216 related to entities in an online system (e.g., online network 118 of FIG. 1), as well as activity data 218 that tracks user activity within and/or outside the online system. In some embodiments, entity data 216 includes data associated with members and/or member profiles in the platform.

For example, entity data 216 for members of an online network may include a set of attributes for each member, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Entity data 216 may also include a set of groups to which the member belongs, the member's contacts and/or connections, awards or honors earned by the member, licenses or certifications attained by the member, patents or publications associated with the member, and/or other data related to the member's interaction with the platform.

Attributes of the members are optionally matched to a number of member segments, with each member segment containing a group of members that share one or more common attributes. For example, member segments in the platform may be defined to include members with the same industry, title, location, and/or language.

Entity data 216 also, or instead, includes data and/or attributes representing other types of entities in the online system. For example, entity data 216 for a company (or other type of organization) includes a name, address, creator or administrator (e.g., a member responsible for the company's presence or "page" in the online system), Uniform Resource Locator (URL), phone number, industry, logo, and/or size of the company. Entity data 216 also, or instead, includes a set of members (or other entities) associated with the company, such as employees of the company, other companies that have business relationships with the company, followers of the company, members that have sent or received messages with the company, and/or members with other types of relationships with the company.

In another example, entity data 216 includes structured and/or unstructured data for job listings and/or job descriptions that are posted and/or provided by members of the online network. For example, entity data 216 for a given job or job listing may include a declared or inferred title, company, required or desired skills, responsibilities, qualifications, role, location, industry, seniority, salary range, benefits, and/or member segment.

Connection information in entity data 216 is optionally combined into a graph, with nodes in the graph representing entities (e.g., users, schools, companies, locations, jobs, etc.) in the platform. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

Activity data 218 includes records of user interactions with one another and/or content associated with the platform. For example, activity data 218 tracks impressions, clicks, likes, dislikes, shares, hides, comments, posts, updates, conversions, and/or other user interaction with content in the platform. Activity data 218 also, or instead, tracks other types of activity, including connections, messages, job applications, searches, interaction between candidates and recruiters, and/or interaction with groups or events. In some embodiments, activity data 218 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. Activity data 218 additionally includes schedules, calendars, and/or upcoming availabilities of the users, which may be used to schedule meetings, interviews, and/or events for the users. Like entity data 216, activity data 218 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, entity data 216, activity data 218, and/or other data 202 in data repository 134 is standardized before the data is used by components of the system. For example, skills in entity data 216 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, companies, and/or other entities in the online network. In a fifth example, data repository 134 includes standardized time periods (e.g., daily, weekly, monthly, quarterly, yearly, etc.) that can be used to retrieve entity data 216, activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform. One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

In one or more embodiments, the system of FIG. 2 includes functionality to detect and resolve duplicates 236 of entities in the online system. In these embodiments, duplicates 236 include multiple representations of users, organizations, groups, goods, services, jobs, content, and/or other entities in data repository 134. Such duplication can be caused by, for example, user error (e.g., creation of multiple company pages by administrators or representatives of the same company), issues with ingesting data related to the entities, and/or system errors (e.g., bugs related to storing and/or retrieving data 202 in data repository 134).

More specifically, a selection apparatus 224 identifies entity pairs 242 that contain potentially duplicated entities in the online system based on inverted indexes 240 of attributes for the entities. In some embodiments, entity pairs 242 include entities with entity data 216 that contains similar or matching attributes. For example, inverted indexes 240 store mappings from strings and/or sub-strings (e.g., tokens, words, n-grams, etc.) found in names, addresses, phone numbers, URLs, and/or other fields in entity data 216 to identifiers for entities that contain the strings and/or substrings. For each pair of entities found in the same mapping in inverted indexes 240 (i.e., each pair of entities that share a common string or sub-string in a corresponding field in entity data 216), selection apparatus 224 obtains a first value of the field from entity data 216 for a first entity in the pair and a second value of the field from entity data 216 for a second entity in the pair. When the first and second values have a similarity that meets or exceeds a threshold, selection apparatus 224 adds the first and second entities to entity pairs 242. Such generation of entity pairs 242 from inverted indexes 240 of entity attributes instead of all possible pairs of entities in the online system reduces the number of comparisons required to select entity pairs 242 and, in turn, improves the efficiency and scalability of the system.

In one or more embodiments, selection apparatus 224 uses different types of comparisons of attributes associated with inverted indexes 240 to generate entity pairs 242. Continuing with the above example, selection apparatus 224 calculates a Jaro-Winkler distance and/or another measure of similarity between names of each pair of entities found under the same mapping associated with entity names in inverted indexes 240. If the similarity exceeds a threshold, the entity pair is added to entity pairs 242.

Selection apparatus 224 also, or instead, generates a normalized phone number for each entity (e.g., converting a US phone number of +1 (321) 555-1212 into a ten-digit normalized number of 3215551212) and/or obtains the normalized phone number from one or more inverted indexes 240. When an entity has multiple phone numbers, the entity is added to and/or obtained from an inverted index for each of the entity's normalized phone numbers. When two entities have the same normalized phone number, the entities are included in entity pairs 242.

Selection apparatus 224 also, or instead, generates or uses one or more inverted indexes 240 of n-grams in each entity's street address combined with normalized or standardized states and zip codes of the entity's location. For each pair of entities identified by the inverted index(es) as having one or more common n-grams and the same state and zip code, selection apparatus 224 calculates a Jaro-Winker distance and/or another measure of similarity between the entities' full normalized addresses. When the similarity exceeds a threshold, the entity pair is added to entity pairs 242.

Selection apparatus 224 also, or instead, generates or uses one or more inverted indexes 240 of sub-strings in URLs of entity websites (e.g., sub-strings containing domains, top-level domains, and/or subdomains in the URLs). For each pair of entities associated with the same mapping in the inverted index(es), selection apparatus 224 adds the pair to entity pairs 242 when one or more portions of the entities' URLs match and/or if a measure of similarity between the URLs exceeds a thresholds.

Next, a feature-processing apparatus 204 uses data 202 from event streams 200 and/or data repository 134 to calculate sets of features for entity pairs 242 identified by selection apparatus 224. First, feature-processing apparatus 204 generates similarity features 220 between attributes of each pair of entities. For example, similarity features 220 are calculated between the names, industries, street addresses, cities, states, countries, geographic regions, website URLs, phone numbers, area codes, logos, and/or other attributes of each candidate pair. These similarity features 220 include, but are not limited to, Jaro-Winkler distances, Levenshtein distances, Jaccard distances, and/or other measures of string similarities; measures of geographic distance between locations of the entities; and/or cosine similarities, Euclidean distances, and/or other measures of vector similarity between semantic embeddings associated with industries or other attributes that describe the entities. In another example, similarity features 200 include the ratio of the sizes of the entities in each candidate pair (e.g., the size of a smaller company in a candidate pair of companies divided by the size of the larger company in the candidate pair).

Feature-processing apparatus 204 also, or instead, calculates relationship features 222 between members associated with each entity in a given entity pair. As mentioned above, members associated with a company (or other organization) include, but are not limited to, employees of the company, followers of the company, users that have sent or received messages with the company, and/or users with other types of relationships or interactions with the company. In this context, relationship features 222 include, but are not limited to, the density of connections between a first set of members (or other entities) associated with the first company in a pair and a second set of members (or other entities) associated with the second company in the pair. The density of connections is calculated by dividing the number of connections between the first set of members and the second set of members by the number of possible connections between the two sets of members. Thus, if the first company is associated with 5 members, the second company is associated with 2 members, and 7 connections exist between members associated with the first company and members associated with the second company, the connection density between the two companies is 7 out of 10 possible connections between the two sets of members, or 0.7.

Relationship features 222 also, or instead, include measures of network distance between representatives of the entities. For example, relationship features 222 include the number of hops between administrators and/or creators of pages or accounts representing the entities in the online system (e.g., same person, first-degree connections, second-degree connections, etc.).

An identification apparatus 208 applies one or more machine learning models 210-212 to similarity features 220 and/or relationship features 222 for some or all entity pairs 242 to identify a subset of entity pairs 242 as duplicates 236 of one another. As shown in FIG. 2, identification apparatus 208 applies machine learning model 210 to some or all similarity features 220 and/or relationship features 222 for entity pairs 242 to generate one set of scores 226 representing likelihoods that entity pairs 242 are duplicates 236.

In some embodiments, machine learning model 210 is trained using user annotations 230 of labels 232 for other pairs of entities and the corresponding similarity features 220 and/or relationship features 222. For example, machine learning model 210 includes a logistic regression model, support vector machine (SVM), tree-based model (e.g., decision tree, random forest, gradient-boosted tree, etc.), neural network, deep learning model, and/or another type of model. A labeling apparatus 206 obtains user-generated labels 232 for a set of entity pairs from annotators via a crowdsourcing platform and/or users involved in developing or maintaining the online system. Identification apparatus 208 and/or another component train machine learning model 210 to predict positive user-generated labels 232 indicating that a pair of entities contains duplicates 236 and negative user-generated labels 232 indicating that a pair of entities does not contain duplicates 236, given the corresponding similarity features 220 and/or relationship features 222. In turn, scores 226 outputted by machine learning model 210 from features for entity pairs 242 include values between 0 and 1, with each value representing the probability that a corresponding pair of entities contains duplicates 236.

Next, identification apparatus 208 generates training data 214 for machine learning model 212 based on scores 226 outputted by machine learning model 210. In one or more embodiments, identification apparatus 208 uses stratified sampling of scores 226 to select a subset of entity pairs 242 for inclusion in training data 214. For example, identification apparatus 208 divides scores 226 into "buckets" or ranges of values (e.g., 0-0.1, 0.1-0.2, 0.2-0.3, etc.). Within each bucket, identification apparatus 208 randomly selects a number or proportion of entity pairs 242 for inclusion in training data 214. Identification apparatus 208 optionally varies the number or proportion of entity pairs 242 selected from each bucket (e.g., a higher number from buckets representing higher likelihoods of duplicates 236 and a lower number from buckets representing lower likelihoods of duplicates 236) so that training data 214 includes a certain class ratio and/or distribution of scores 226.

After a subset of entity pairs 242 are sampled for inclusion in training data 214, labeling apparatus 206 generates labels 232 in training data 214 based on user annotations 230 and assessments 234 of the accuracy of annotations 230. For example, labeling apparatus 206 displays and/or outputs entity data 216 for each entity pair in training data 214 to a number of user annotators. In response, the annotators generate annotations 230 indicating whether or not the entity pair contains duplicates 236. Labeling apparatus 206 then generates a label for the entity pair based on a consensus and/or majority vote from annotations 230 for the entity pair.

To improve the accuracy of annotations 230, labeling apparatus 206 additionally displays and/or outputs, to the users, assessments 234 containing entity data 216 for a set of entity pairs with known labels 232 (i.e., pairs of entities that are known to be duplicates 236 or non-duplicates). If a given user consistently and/or repeatedly generates annotations 230 for assessments 234 that do not match the corresponding known labels 232, labeling apparatus 206 omits the user's annotations 230 for entity pairs 242 from the generation of labels 232 for entity pairs 242.

After labels 232 for entity pairs 242 in training data 214 are produced, identification apparatus 208 uses labels 232 and the corresponding similarity features 220 and/or relationship features 222 to train machine learning model 212. For example, identification apparatus 208 inputs measures and/or indicators of similarity between the names, industries, addresses, geographic regions, websites, phone numbers, area codes, and/or logos of each pair of companies in training data 214 into machine learning model 212. Identification apparatus 208 also, or instead, inputs the network distance between creators or administrators of the two companies and/or the density of connections between members associated with the two companies into machine learning model 212. Identification apparatus 208 then uses a training technique and/or one or more hyperparameters to update parameter values of machine learning model 212 so that predictions outputted by machine learning model 212 reflect the corresponding labels 232. Because machine learning model 212 is trained using a subset of entity pairs 242 with a certain class ratio and/or distribution of scores 226 from machine learning model 210 and labels 232 that are generated from annotations 230 provided by users that perform well on assessments 234, machine learning model 212 may predict duplicates 236 with better precision and/or recall than machine learning model 210.

Identification apparatus 208 then applies the trained machine learning model 212 to similarity features 220 and/or relationship features 222 for remaining entity pairs 242 identified by selection apparatus 224 to generate scores 228 that classify each candidate pair 242 as containing or not containing duplicates 236. For example, machine learning model 212 includes a logistic regression model, decision tree, random forest, gradient boosted tree, neural network, and/or wide-and-deep model that outputs a score from 0 to 1 representing the likelihood that a pair of entities contains duplicates 236, given the corresponding similarity features 220 and/or relationship features 222. After scores 228 are generated for all entity pairs 242 not included in training data 214, identification apparatus 208 identifies a subset of entity pairs 242 with scores that exceed a threshold as duplicates 236.

Finally, identification apparatus 208 resolves duplicates 236 in entity pairs 242 by selecting and/or generating a canonical entity (e.g., canonical entities 238) for each candidate pair that contains duplicates 236. Identification apparatus 208 then updates data repository 134 and/or the user interface of the online system so that the canonical entity is queried and/or outputted in lieu of one or more duplicated entities. For example, identification apparatus 208 "deactivates" all duplicates 236 of a given entity that are not identified as the canonical version of the entity, thus preventing inclusion of the duplicates in content related to the entity that is outputted by the online system. Identification apparatus 208 also, or instead, suppresses, de-ranks, and/or removes duplicate entities that are not selected or used as canonical entities from data repository 134 and/or the online system.

In one or more embodiments, identification apparatus 208 identifies canonical entities 238 within the corresponding duplicates 236 based on additional completeness features 240 and interaction features 242 generated by feature-processing apparatus 204. Completeness features 240 include measures or indicators of completeness in entity data 216 for each entity. For example, completeness features 240 include binary indicators of the presence or absence of an address, industry, description, website, logo, and/or other fields in entity data 216 for each entity in a pair or set of duplicates 236. Completeness features 240 also, or instead, include metrics representing the length of a description of the entity, the number of completed fields in entity data 216 for the entity, the number of members associated with the entity, and/or the number of administrators associated with the entity.

Interaction features 242 include metrics representing the amount of interaction between users of the online system and the entity. For example, interaction features 242 include the number of page views, followers, saves, messages, and/or other types of user actions associated with the entity in the online system (e.g., over a given period).

After completeness features 240 and interaction features 242 are generated for a given set of duplicates 236, identification apparatus 208 uses a set of rules and/or an additional machine learning model (not shown) to identify and/or generate a canonical entity within the duplicates. For example, identification apparatus 208 uses the rules to select an entity with more complete entity data 216 and/or greater interaction with users of the online system as the canonical entity for a given pair or set of duplicates 236. In another example, identification apparatus 208 inputs completeness features 240 and interaction features 242 for a pair of entities identified as duplicates 236 into another machine learning model, and the machine learning model generates one or more scores and/or other output specifies one of the entities as the canonical entity in the pair. In a third example, identification apparatus 208 creates a canonical entity by merging fields in entity data 216 from a corresponding pair of duplicated entities. Each field in entity data 216 for the canonical entity is selected to be the more "complete" field from the pair of duplicated entities. In a fourth example, identification apparatus 208 and/or labeling apparatus 206 select the canonical entity in a given pair or set of duplicates 236 based on one or more user annotations 230 that indicate the canonical entity in the pair.

In some embodiments, the system of FIG. 2 includes functionality to improve the identification and resolution of potential duplicates 236 in a subset of entities with higher visibility and/or importance in the online system. For example, the subset of entities includes Fortune 500 companies, influencers, and/or other prominent entities in the online system.

First, selection apparatus 224 searches entity data 216 for all entities with names that contain a string representing the name of a company or other entity in the subset of entities. Selection apparatus 224 optionally filters known subsidiaries, franchises, and/or other variations of the company from the entities. Selection apparatus 224 then generates entity pairs 242 associated with the entity as all possible pairs of entities with names that contain the string.

Next, identification apparatus 208 uses machine learning model 212 to generate scores 228 for entity pairs 242 associated with the subset of entities. Identification apparatus 208 also applies a lower threshold to scores 228 to identify duplicates 236 in the subset of entities. Finally, identification apparatus 208 and/or labeling apparatus 206 query a set of users for annotations 230 of the canonical company in each pair or set of duplicates 236 for a given entity name and uses annotations 230 to select the canonical entity for the entity name.

By automatically identifying and reducing duplicate entities in the online system based on machine learning models and a small set of user-annotated labels, the disclosed embodiments improve the quality and integrity of data in the online system. Because the number of entities in the online system is reduced, consumption of processor, memory, storage, network, and/or other resources involved in storing, querying, transmitting, serving, and/or otherwise utilizing data representing the entities is also reduced. Moreover, the generation of candidate pairs of entities using inverted indexes allows duplicate detection and resolution to be performed in a more efficient, frequent, and/or scalable manner than a brute force approach that performs pairwise comparisons of all entities to detect duplicates. Consequently, the disclosed embodiments improve computer systems, applications, user experiences, tools, and/or technologies related to storing, processing, querying, and/or recommending data or content related to entities.

Those skilled in the art will appreciate that the system of FIG. 2 may be implemented in a variety of ways. First, feature-processing apparatus 204, identification apparatus 208, labeling apparatus 206, selection apparatus 224, and/or data repository 134 may be provided by a single physical machine, multiple computer systems, one or more virtual machines, a grid, one or more databases, one or more filesystems, and/or a cloud computing system. Feature-processing apparatus 204, identification apparatus 208, labeling apparatus 206, and selection apparatus 224 may additionally be implemented together and/or separately by one or more hardware and/or software components and/or layers.

Second, a number of machine learning models and/or techniques may be used to generate scores 226-228 and/or identify duplicates 236 and/or canonical entities 238. For example, machine learning models 210-212 may include regression models, neural networks, SVMs, decision trees, gradient boosted trees, random forests, naïve Bayes classifiers, Bayesian networks, clustering techniques, collaborative filtering techniques, deep learning models, wide-and-deep models, hierarchical models, and/or ensemble models. The retraining or execution of each machine learning model may also be performed on an offline, online, and/or on-demand basis to accommodate requirements or limitations associated with the processing, performance, or scalability of the system and/or the availability of features and/or labels 232 used to train the machine learning model. In another example, machine learning model 210 includes and/or is substituted with a set of rules, heuristics, and/or other techniques that are used to bootstrap or select training data for machine learning model 210.

Figure 3:
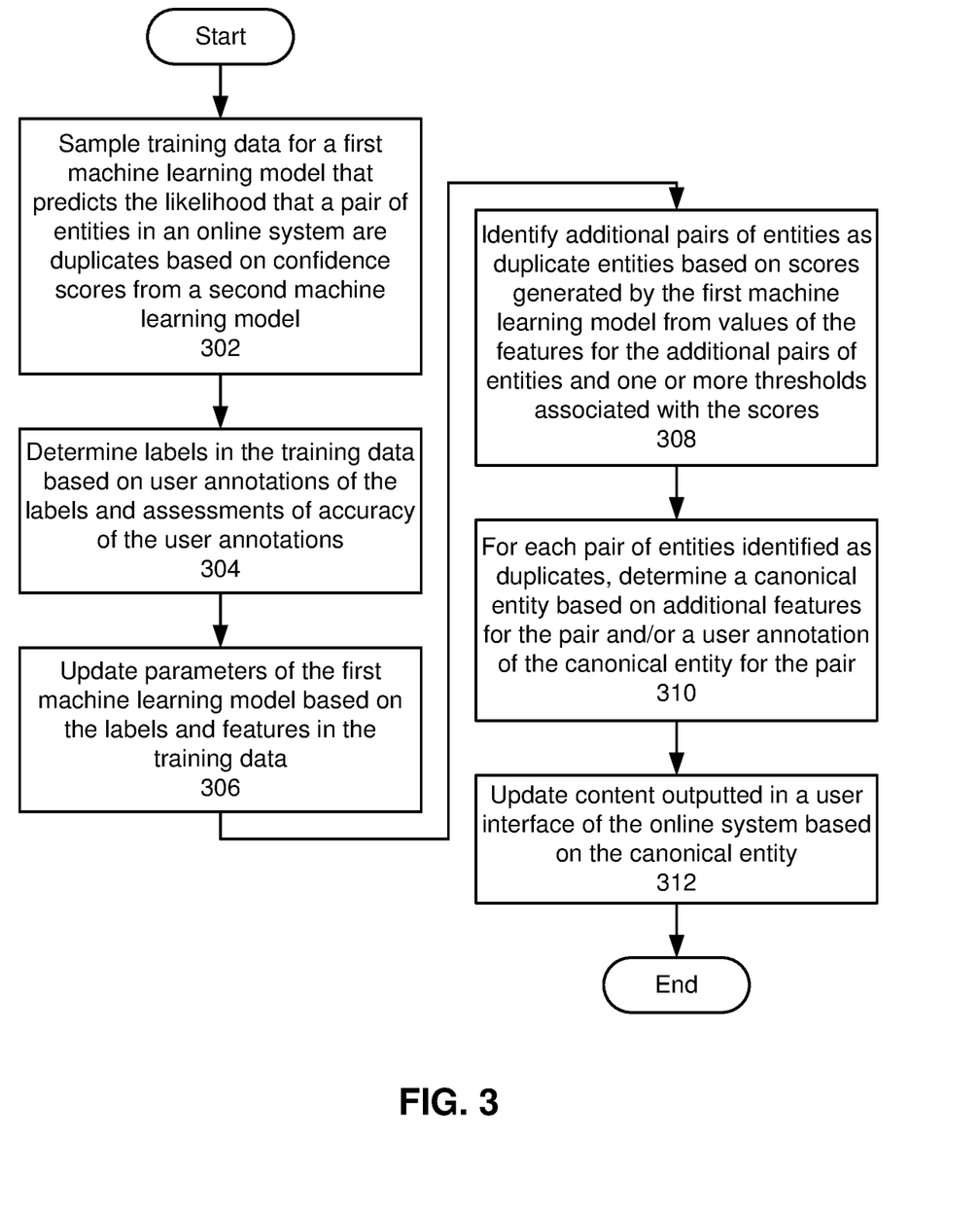
FIG. 3 shows a flowchart illustrating a process of identifying duplicate entities in accordance with the disclosed embodiments.

FIG. 3 shows a flowchart illustrating a process of identifying duplicate entities in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, training data for a first machine learning model that predicts the likelihood that a pair of entities in an online system are duplicates is sampled based on confidence scores from a second machine learning model (operation 302). For example, pairs of entities in the online system are identified as candidates for containing duplicates by obtaining each pair from a mapping in an inverted index of an attribute (e.g., name, address, URL, phone number, etc.) associated with the entities and determining that a similarity between values of the attribute associated with the pair meets or exceeds a threshold. The second machine learning model is applied to features for each pair of entities to generate the confidence scores. The features include, but are not limited to, a similarity between one or more attributes of a first entity in the pair and one or more corresponding attributes of a second entity in the pair. The attributes include, but are not limited to, the entities' names, locations, industries, phone numbers, URLs, and/or logos. The features also, or instead, include, a network distance between creators of the two entities and/or a comparison of the entities' sizes. After the confidence scores are produced for the entities, the training data is sampled to include subsets of the pairs of the entities associated with different ranges of the confidence scores.

Next, labels in the training data are determined based on user annotations of the labels and assessments of accuracy of the user annotations (operation 304). For example, multiple users are presented entity data for pairs of entities in the training data and queried for annotations of labels that indicate whether or not the pairs of entities in the training data contain duplicates. A label for each pair of entities is then generated based on a consensus and/or majority vote from user annotations of the label. To improve the accuracy of the labels, assessments or benchmarks containing entity data for a set of entity pairs with known labels are also presented to the users. If a given user consistently and/or repeatedly generates annotations for assessments that do not match the corresponding known labels, the user's annotations for other entity pairs are omitted from the generation of labels for the entity pairs.

Parameters of the first machine learning model are then updated based on the labels and features in the training data (operation 306). For example, the features include a density of connections between a first set of members associated with the first entity in a pair and a second set of members associated with the second entity in the pair and/or a similarity between one or more attributes of the first entity and one or more corresponding attributes of the second entity. Features for each entity pair are inputted into the first machine learning model, and the parameters of the first machine learning model are updated so that the output of the first machine learning model reflects the corresponding label for the entity pair.

After training of the first machine learning model is complete, additional pairs of entities are identified as duplicate entities based on scores generated by the first machine learning model from values of the features for the additional pairs of entities and one or more thresholds associated with the scores (operation 308). For example, the first machine learning model is applied to features for each pair of entities identified as a candidate for containing duplicates to produce a score representing the likelihood that the pair of entities contains duplicates. If the pair of entities is not associated with a subset of "important" or "high-visibility" entities (e.g., Fortune 500 companies), a first threshold is applied to the score to classify the entities as duplicates or non-duplicates. If the pair of entities is associated with the subset of entities, a second, lower threshold is applied to the score to perform the classification.

A canonical entity is also determined for each pair of entities identified as duplicates based on additional features for the pair and/or a user annotation of the canonical entity for the pair (operation 310). For example, the features include the completeness of various fields for each entity in the pair, the number of members of the online system associated with each entity in the pair, and/or the level of interaction between the members and each entity in the pair. A set of rules and/or another machine learning model are applied to the features to select the canonical entity as the more "complete" entity and/or the entity with higher level of user interaction in the pair. In another example, a set of entities identified as duplicates of a Fortune 500 company and/or another "important" entity are presented to one or more users, and a canonical entity is selected from the set of entities based on annotations provided by the users.

Finally, content outputted in a user interface of the online system is updated based on the canonical entity (operation 312). For example, the canonical entity is outputted in search results, recommendations, and/or other content containing the entity, and other entities identified as duplicates of the same entity are omitted from display and/or output within the user interface.

Figure 4:
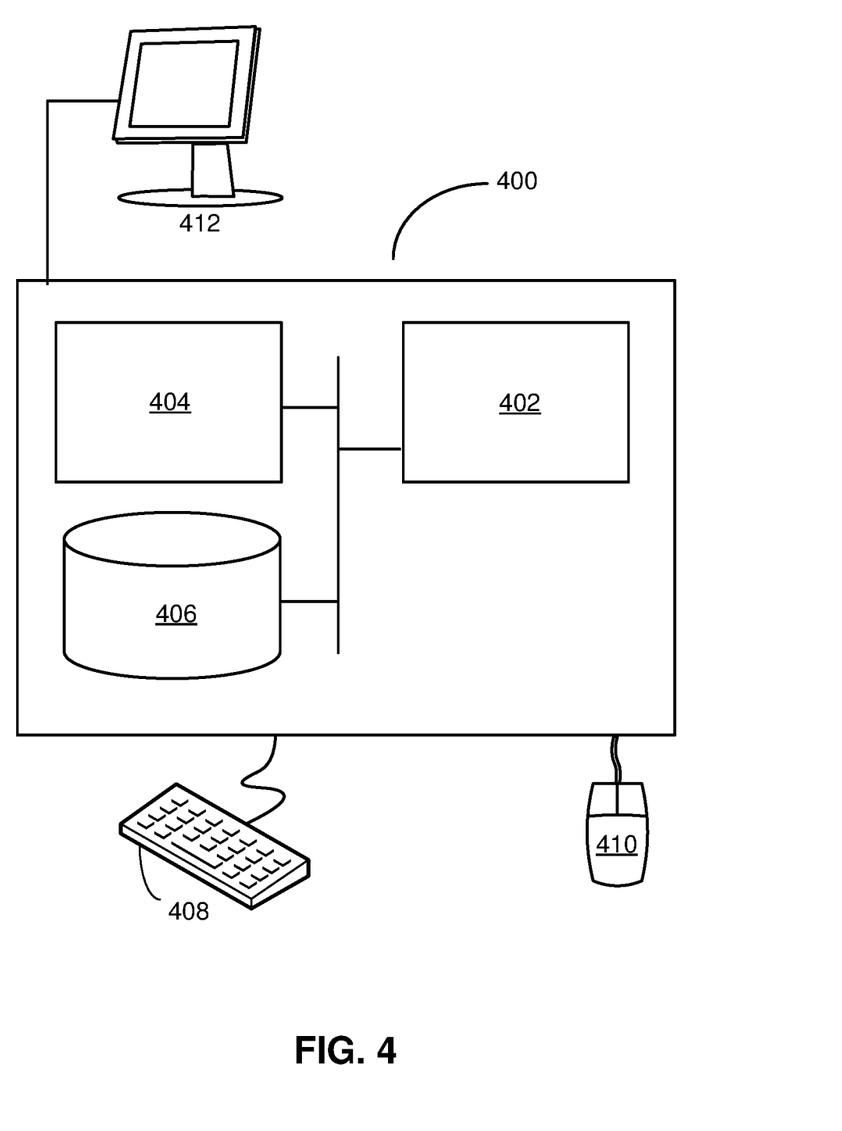
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 includes functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications obtain the use of hardware resources on computer system 400 from the operating system, as well as interact with the user through a hardware and/or software framework provided by the operating system.

In one or more embodiments, computer system 400 provides a system for identifying duplicate entities. The system includes a feature-processing apparatus, an identification apparatus, a labeling apparatus, and a selection apparatus, one or more of which may alternatively be termed or implemented as a module, mechanism, or other type of system component. The selection apparatus and/or identification apparatus select training data for a first machine learning model based on confidence scores from a second machine learning model, which represent likelihoods that pairs of entities in an online system are duplicates. Next, the labeling apparatus determines labels in the training data based on user annotations of the labels and assessments of accuracy of the user annotations, and the identification apparatus updates parameters of the first machine learning model based on features and labels in the training data. The identification apparatus then identifies additional pairs of the entities as duplicate entities based on scores generated by the first machine learning model from values of the features for the additional pairs and one or more thresholds associated with the scores. Finally, the identification apparatus updates content outputted in a user interface of the online system based on the identified duplicate entities.

In addition, one or more components of computer system 400 may be remotely located and connected to the other components over a network. Portions of the present embodiments (e.g., feature-processing apparatus, identification apparatus, labeling apparatus, selection apparatus, data repository, online network, etc.) may also be located on different nodes of a distributed system that implements the embodiments. For example, the present embodiments may be implemented using a cloud computing system that identifies and resolves duplicate entities on a remote online system.

By configuring privacy controls or settings as they desire, members of a social network, an online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings, and is in compliance with applicable privacy laws of the jurisdictions in which the members or users reside.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    selecting training data for a first machine learning model based on confidence scores representing likelihoods that pairs of entities in an online system are duplicates;
    updating, by one or more computer systems, parameters of the first machine learning model based on features and labels in the training data;
    identifying, by the one or more computer systems, a first subset of additional pairs of the entities as duplicate entities based on scores generated by the first machine learning model from values of the features for the additional pairs and a first threshold associated with the scores; and
    updating, by the one or more computer systems, content outputted in a user interface of the online system based on the identified first subset of the additional pairs by, for each pair in the first subset of the additional pairs of the entities, determining a canonical entity based on additional features for the pair; and omitting output of a remaining entity that is not the canonical entity in the pair in the user interface of the online system.

2. The method of claim 1, wherein the additional features comprise at least one of:
    a completeness of data for each entity in the pair;
    a number of members of the online system associated with each entity in the pair;
    a level of interaction between the members of the online system and each entity in the pair; and
    a user annotation of a first entity in the pair as the canonical entity.

3. The method of claim 1, wherein selecting the training data for the first machine learning model based on the confidence scores representing the likelihoods that the pairs of the entities are duplicates comprises:
    generating the pairs of the entities based on similarities in attributes of the entities; and
    sampling the training data to include subsets of the pairs of the entities associated with different ranges of the confidence scores.

4. The method of claim 3, wherein generating the pairs of the entities based on the similarities in the attributes of the entities comprises:
    obtaining a pair of entities from a mapping in an inverted index of an attribute; and
    when a similarity between values of the attribute associated with the pair meets a threshold, adding the pair to the pairs of the entities.

5. The method of claim 3, wherein the attributes comprise at least one of:
    a name;
    an address;
    a phone number; and
    a Uniform Resource Locator (URL).

6. The method of claim 1, wherein selecting the training data for the first machine learning model based on the confidence scores representing the likelihoods that the pairs of the entities are duplicates comprises:
    applying a second machine learning model to additional features for the pairs of the entities to generate the confidence scores.

7. The method of claim 6, wherein:
    the additional features comprise a similarity between one or more attributes of a first entity in a pair of entities and one or more corresponding attributes of a second entity in the pair of entities, and
    the one or more attributes and the one or more corresponding attributes comprise at least one of:
    a name;
    a location;
    an industry;
    a phone number;
    a Uniform Resource Locator (URL); and
    a logo.

8. The method of claim 6, wherein the additional features comprise at least one of:
    a network distance between a first creator of a first entity in a pair of entities and a second creator of a second entity in the pair of entities; and
    a comparison of a first size of the first entity and a second size of the second entity.

9. The method of claim 1, wherein selecting the training data for the first machine learning model based on the confidence scores representing the likelihoods that the pairs of the entities are duplicates comprises:
    determining the labels based on user annotations of the labels and assessments of accuracy of the user annotations.

10. The method of claim 1, further comprising:
identifying a second subset of the additional pairs of entities as additional duplicate entities based on the scores generated by the first machine learning model from the values of the features for the additional pairs of entities and a second threshold associated with the scores; and
for each pair in the second subset of the additional pairs of the entities, selecting a canonical entity based on a user annotation of the canonical entity for the pair.

11. The method of claim 1, wherein the features comprise:
a density of connections between a first set of members associated with a first entity and a second set of members associated with a second entity; and
a similarity between one or more attributes of the first entity and one or more corresponding attributes of the second entity.

12. The method of claim 1, wherein the entities comprise companies in the online system.

13. A system, comprising:
one or more processors; and
memory storing instructions that, when executed by the one or more processors, cause the system to:
obtain a first machine learning model that predicts a likelihood that a pair of entities in an online system are duplicates based on features that comprise a density of connections between a first set of members associated with a first entity in the pair and a second set of members associated with a second entity in the pair;
identify a first subset of pairs of the entities as duplicate entities based on scores generated by the first machine learning model from values of the features for the pairs of the entities and a first threshold associated with the scores;
for each pair in the first subset of the pairs of the entities, determine a canonical entity based on additional features for the pair;
update content outputted in a user interface of the online system based on the canonical entity;
sample training data for the first machine learning model based on confidence scores from a second machine learning model, wherein the confidence scores represent likelihoods that pairs of entities in the online system are duplicates;
determine labels in the training data based on user annotations of the labels and assessments of accuracy of the user annotations; and
update parameters of the first machine learning model based on the labels and the features in the training data.

14. The system of claim 13, wherein sampling the training data for the first machine learning model based on the confidence scores comprises:
generating the pairs of the entities based on inverted indexes associated with values of attributes of the pairs of the entities and similarities in the attributes of the pairs of the entities; and
sampling the training data to include subsets of the pairs of the entities associated with different ranges of the confidence scores.

15. The system of claim 14, wherein the attributes comprise at least one of:
a name;
an address;
a phone number; and
a Uniform Resource Locator (URL).

16. The system of claim 13, wherein the features comprise:
a density of connections between a first set of members associated with a first entity and a second set of members associated with a second entity; and
a similarity between one or more attributes of the first entity and one or more corresponding attributes of the second entity.

17. The system of claim 13, wherein the additional features comprise at least one of:
a completeness of data for each entity in the pair;
a number of members of the online system associated with each entity in the pair;
a level of interaction between the members of the online system and each entity in the pair; and
a user annotation of a first entity in the pair as the canonical entity.

18. A non-transitory computer-readable storage medium storing instructions that when executed by a computer cause the computer to perform a method, the method comprising:
selecting training data for a first machine learning model based on confidence scores representing likelihoods that pairs of entities in an online system are duplicates;
updating parameters of the first machine learning model based on features and labels in the training data;
identifying a first subset of additional pairs of the entities as duplicate entities based on scores generated by the first machine learning model from values of the features for the additional pairs and a first threshold associated with the scores; and
updating content outputted in a user interface of the online system based on the identified first subset of the additional pairs by, for each pair in the first subset of the additional pairs of the entities, determining a canonical entity based on additional features for the pair; and omitting output of a remaining entity that is not the canonical entity in the pair in the user interface of the online system.

* * * * *